(12) United States Patent
Kageyama et al.

(10) Patent No.: US 12,196,690 B2
(45) Date of Patent: Jan. 14, 2025

(54) STRUCTURE INFORMATION ACQUISITION METHOD AND STRUCTURE INFORMATION ACQUISITION APPARATUS

(71) Applicants: RIGAKU CORPORATION, Tokyo (JP); TOYOTA JIDOSHA KABUSHIKI KAISHA, Toyota (JP)

(72) Inventors: Masashi Kageyama, Tokyo (JP); Kenichi Okajima, Tokyo (JP); Masaru Kuribayashi, Tokyo (JP); Yuzo Miura, Toyota (JP); Yuichi Nagamatsu, Toyota (JP)

(73) Assignees: RIGAKU CORPORATION, Tokyo (JP); TOYOTA JIDOSHA KABUSHIKI KAISHA, Toyota (JP)

(*) Notice: Subject to any disclaimer, the term of this patent is extended or adjusted under 35 U.S.C. 154(b) by 112 days.

(21) Appl. No.: 17/989,720

(22) Filed: Nov. 18, 2022

(65) Prior Publication Data

US 2023/0160840 A1    May 25, 2023

(30) Foreign Application Priority Data

Nov. 24, 2021  (JP) .................................. 2021-189927

(51) Int. Cl.
*G01N 23/041*    (2018.01)
(52) U.S. Cl.
CPC ..... *G01N 23/041* (2018.02); *G01N 2223/401* (2013.01); *G01N 2223/646* (2013.01)
(58) Field of Classification Search
CPC ........... G01N 23/041; G01N 2223/401; G01N 2223/646; G01N 2223/405; G01N 2223/605; G01N 2223/615; G01N 2223/623; G01N 23/20083; G01N 2223/1016; G01N 2223/631; G01N 2223/645

See application file for complete search history.

(56) References Cited

U.S. PATENT DOCUMENTS 7,180,979 B2      2/2007  Momose
2023/0416474 A1*  12/2023 Komukai ............... H02K 1/278

FOREIGN PATENT DOCUMENTS

| JP | 2015-75428 A | 4/2015 |
|----|----|----|
| JP | 2015-214087 A | 12/2015 |
| JP | 2017-3409 A | 1/2017 |
| JP | 2018-91765 A | 6/2018 |

(Continued)

OTHER PUBLICATIONS

Translation of WO 0018566 A1 (Year: 2000).*

(Continued)

*Primary Examiner* — David P Porta
*Assistant Examiner* — Mamadou Faye
(74) *Attorney, Agent, or Firm* — XSENSUS LLP (57) ABSTRACT

There is provided a technique for non-destructively and relatively easily acquiring orientation information of an anisotropic material even for a large-sized object. An object is irradiated with X-rays in a tangential direction of a curved anisotropic material from a radiation source of a phase-contrast X-ray optical system. A scattering image is then obtained using a detection signal of X-rays having penetrated through the object. Structure information of the anisotropic material is acquired based on the scattering image.

6 Claims, 11 Drawing Sheets

(56) References Cited

FOREIGN PATENT DOCUMENTS

| JP | 2021-89195 A | 6/2021 | | |
|---|---|---|---|---|
| WO | WO-0018566 A1 * | 4/2000 | ........... | B29C 70/443 |
| WO | 2004/058070 A1 | 7/2004 | | |
| WO | WO-2019142451 A1 * | 7/2019 | ............... | A61B 6/02 |

OTHER PUBLICATIONS

Translation of WO2019142451 (Year: 2019).*
Wincheski et al., "Development of eddy current probe for fiber orientation assessment in carbon fiber composites", AIP Conference Proceedings, vol. 1949, No. 120004, Apr. 20, 2018, pp. 120004-1-120004-7.
Kageyama et al., "X-ray phase-imaging scanner with tiled bent gratings for large-field-of-view nondestructive testing", NDT and E International, vol. 105, Apr. 26, 2019, pp. 19-24.
Sharma et al., "Six dimensional X-ray Tensor Tomography with a compact laboratory setup", Applied Physics Letters, vol. 109, No. 134102, Sep. 26, 2016, pp. 134102-1-134102-5.
Pfeiffer et al., "Phase retrieval and differential phase-contrast imaging with low-brilliance X-ray sources." Nature Physics, vol. 2, Apr. 2006, pp. 258-261.
Donath et al., "Inverse geometry for grating-based x-ray phase-contrast imaging", Journal of Applied Physics, vol. 106, No. 054703, Oct. 2009, pp. 054703-1-054703-7.
Olivo, "Edge-illumination x-ray phase-contrast imaging", Journal of Physics: Condensed Matter, vol. 33, No. 363002, Jul. 13, 2021, pp. 1-12.

\* cited by examiner

(B) SPECIFIC REGION, EXTRACTED FROM X-RAY SCATTERING IMAGE, IN WHICH FIBER ORIENTATION DIRECTION MATCHES X-RAY INCIDENT DIRECTION (D) HISTOGRAMS AND STATISTICS OF SCATTERING INTENSITY WITHIN TWO TYPES OF REGIONS (A) X-RAY SCATTERING IMAGE

Fig. 11

TWO TYPES OF
EXTRACTED REGIONS AND
THEIR AREAS

STRUCTURE INFORMATION ACQUISITION METHOD AND STRUCTURE INFORMATION ACQUISITION APPARATUS

CROSS-REFERENCE TO RELATED APPLICATION

The present application claims priority to Japanese Patent Application No. 2021-189927, filed Nov. 24, 2021, the contents of which are incorporated by reference herein in its entirety.

BACKGROUND OF THE INVENTION

Field of the Invention

The present invention relates to a technique for non-destructively acquiring structure information of an object.

Description of the Related Art

In recent years, the conversion of automobiles to EVs (Electric Vehicles) has been promoted in countries around the world, and fuel cell vehicles are expected to be one of them. Since fuel cell vehicles use hydrogen as an energy source, each fuel cell vehicle is equipped with a hydrogen tank capable of storing hydrogen.

As a hydrogen tank to be installed in a fuel cell vehicle, a tank made of CFRP (Carbon Fiber Reinforced Plastics) is employed to achieve both lightness and rigidity. The CFRP tank has a plurality of layer structures with different fiber orientations, and a positional relationship between them determines its mechanical properties. Therefore, it is important that the layer structures with the fiber orientations are in a correct positional relationship.

It is generally difficult to understand the internal structure of CFRP after resin molding from the appearance of the tank. Cutting the tank enables the actual state of fiber orientations to be measured, but the tank that has been cut becomes unusable.

Therefore, Japanese Patent Laid-Open No. 2017-003409 proposes a technique for non-destructively measuring an orientation of a fiber that constitutes CFRP using a pulse laser. Further, Japanese Patent Laid-Open No. 2015-075428 proposes a technique for measuring physical properties of CFRP using electromagnetic induction heating. However, with these techniques, it is difficult to measure the position of the fiber layer structure in CFRP with sufficient accuracy.

As a technique for non-destructively measuring an orientation of an anisotropic material such as a fiber, the following non-patent literature proposes a method using an eddy current probe: Russell A. Wincheski, and Selina Zhao, AIP Conference Proceedings 1949, 120004 (2018). Further, the following non-patent literature proposes a method using an X-ray phase-contrast method: M. Kageyama, et al., NDT and E International 105 (2019) 19-24. However, all of these methods are to measure a two-dimensional orientation of a plate-shaped sample, and it is difficult to apply these methods to a three-dimensional sample such as a hydrogen tank.

As a technique for measuring a three-dimensional orientation of an anisotropic material, there is a technique using X-ray CT, as described in Japanese Patent Laid-Open No. 2018-091765 and the following non-patent literature: Y. Sharma, et al., Appl. Phys. Lett. 109, 134102 (2016). However, in the case of the technique using CT, it is necessary to keep an entire object within the field of view. Therefore, it is difficult for these techniques to measure the structure of a large-sized object such as a hydrogen tank.

The present invention has been made in view of the situation described above. It is an objective of the present invention to provide a technique capable of acquiring orientation information of an anisotropic material non-destructively, relatively easily, and accurately, even for a large-sized object.

SUMMARY OF THE INVENTION

The present invention can be expressed as an invention described in the following items.
(Item 1)
A structure information acquisition method for acquiring structure information of an object having a curved anisotropic material using a phase-contrast X-ray optical system, the structure information acquisition method including:
  a step of irradiating the object with X-rays in a tangential direction of the curved anisotropic material from a radiation source of the phase-contrast X-ray optical system;
  a step of obtaining a scattering image using a detection signal of the X-rays having penetrated through the object; and
  a step of acquiring structure information of the anisotropic material based on the scattering image.
(Item 2)
The structure information acquisition method according to item 1, wherein
  the object is a high-pressure tank, the anisotropic material is a fiber constituting the high-pressure tank, a part of the fiber is wound in a hoop-winding, and another part of the fiber is wound in a direction different from a direction of the hoop-winding.
(Item 3)
The structure information acquisition method according to item 1 or 2, wherein
  the anisotropic material is curved to form a circle or an ellipse.
(Item 4)
The structure information acquisition method according to any one of items 1 to 3, further including a step of supporting the object before irradiating the object with the X-rays, wherein,
  in the step of supporting the object, the object is supported so that a direction of X-rays radiated from a radiation source of the phase-contrast X-ray optical system is along a tangential direction of the curved anisotropic material.
(Item 5)
A structure information acquisition apparatus, including:
  a phase-contrast X-ray optical system for acquiring a scattering image of an object; and
  a processing unit, wherein
  the phase-contrast X-ray optical system includes a grating unit, a radiation source for irradiating the grating unit and the object with X-rays, and a detection unit for detecting the X-rays having passed through the grating unit and the object,
  the object includes a curved anisotropic material,
  a direction of the X-rays from the radiation source is along a tangential direction of the curved anisotropic material, and
  the processing unit includes a scattering image generation unit for obtaining a scattering image based on an intensity distribution image of the X-rays obtained by the detection unit, and an extraction unit for extracting structure information of the anisotropic material in the scattering image.

(Item 6)

The structure information acquisition apparatus according to item 5, further including a support mechanism for supporting the object, wherein the support mechanism is configured to support the object so that a direction of X-rays radiated from the radiation source of the phase-contrast X-ray optical system is along a tangential direction of the curved anisotropic material.

According to the present invention, even if the object is a large-sized object such as a hydrogen tank, it is possible to acquire the orientation information of the anisotropic material included in the object non-destructively, relatively easily and accurately.

BRIEF DESCRIPTION OF THE DRAWINGS

FIG. 10(A) is a scattering image in Example 1, FIG. 10(B) is an explanatory view showing regions extracted from FIG. 10(A), FIGS. 10(C) and 10(D) are histograms and statistics of scattering intensities in corresponding regions.

DETAILED DESCRIPTION OF THE PREFERRED EMBODIMENTS

A structure information acquisition apparatus according to an embodiment of the present invention and a structure information acquisition method using the same will be described below with reference to the drawings. First, as a base of the description, a configuration example of an object from which information is to be acquired will be described.

(Object)

A hydrogen tank for a fuel cell vehicle is used as an object 1 in the present embodiment. The object 1 has a liner portion 11 made of a resin and carbon fibers (that is, anisotropic materials) 12 wound around the outer periphery of the liner portion 11 (see FIG. 1).

Figure 1:
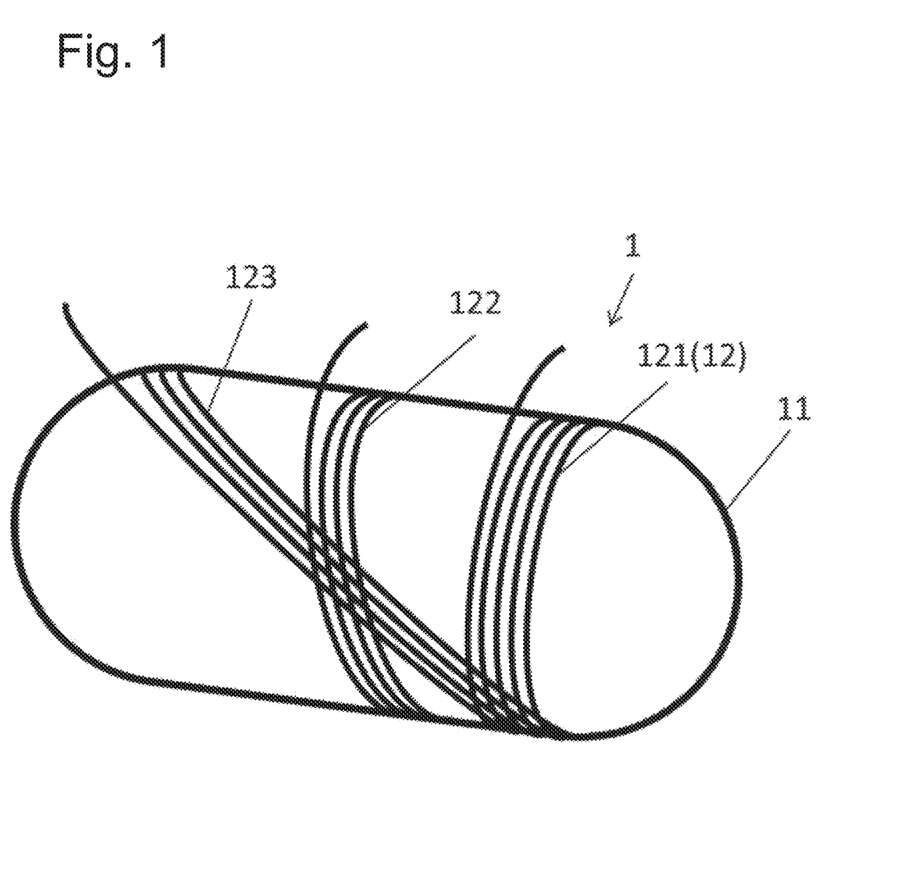
FIG. 1 is an explanatory diagram schematically showing an example of an object to be measured in a structure information acquisition method according to an embodiment of the present invention.

The liner portion 11 has a cylindrical shape with both ends closed so that hydrogen can be stored inside. Both ends of the liner portion 11 are spherical to avoid stress concentration. However, both ends of the liner portion 11 may have flat surfaces. Also, the liner portion 11 is not limited to a cylindrical shape, and may have another appropriate shape such as an ellipsoidal shape and a spherical shape.

The carbon fibers 12 have a hoop-winding (that is, a hoop-layer) 121, a high-angle helical winding (that is, a high-angle helical layer) 122, and a low-angle helical winding (that is, a low-angle helical layer) 123, each being wound around the liner portion 11 in a layer. As a result, a part of the carbon fibers 12 is wound in a hoop-winding, and the other parts are wound in different winding directions. Here, the hoop-winding is a fiber wound in a direction substantially perpendicular to a central shaft of the liner portion 11. The high-angle helical winding is a fiber wound in an oblique direction with respect to the central shaft of the liner portion 11. The low-angle helical winding is a fiber obliquely wound at an angle lower (that is, at an angle closer to parallel to the central shaft of the liner portion 11) than that of the high-angle helical winding. Note that, in FIG. 1, the ends of the fibers in the respective layers are separated from the liner portion 11 for easy understanding, but in an actual hydrogen tank, the fibers are tightly wound around the liner portion 11 (See, for example, Japanese Patent Laid-Open No. 2015-214087).

Figure 2:
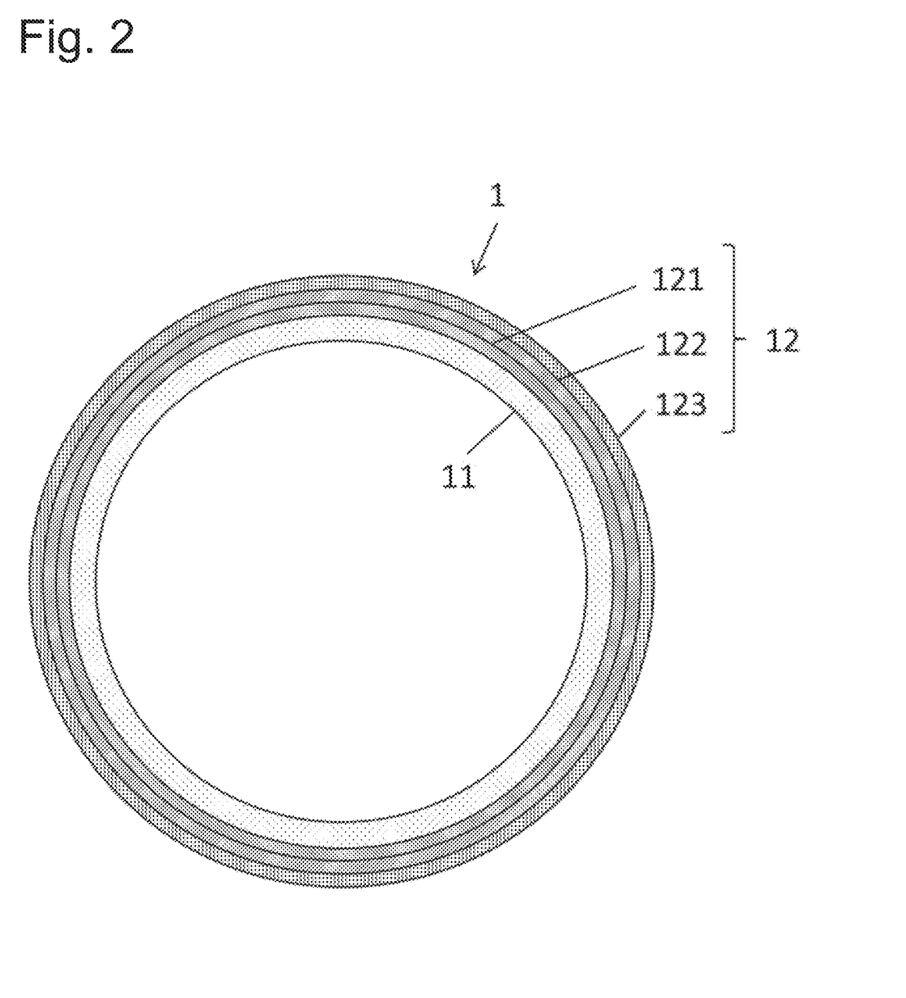
FIG. 2 is a schematic cross-sectional view of the object in FIG. 1.

Further, with reference to FIG. 2, a cross-sectional structure of the object 1 will be described. FIG. 2 schematically shows the structure for easy understanding, and the dimensional ratio is not accurate. As shown in FIG. 2, the hoop-winding 121, the high-angle helical winding 122, and the low-angle helical winding 123 are arranged in layers. Note that the stacking order of these layers is not limited to the example in FIG. 2. Due to the structure described above, the object 1 of the present embodiment has fibers that are each a long anisotropic material curved in an arc shape.

(Structure Information Acquisition Apparatus of the Present Embodiment)

Next, the structure information acquisition apparatus according to the present embodiment will be described with reference to FIGS. 3 to 5.

Figure 3:
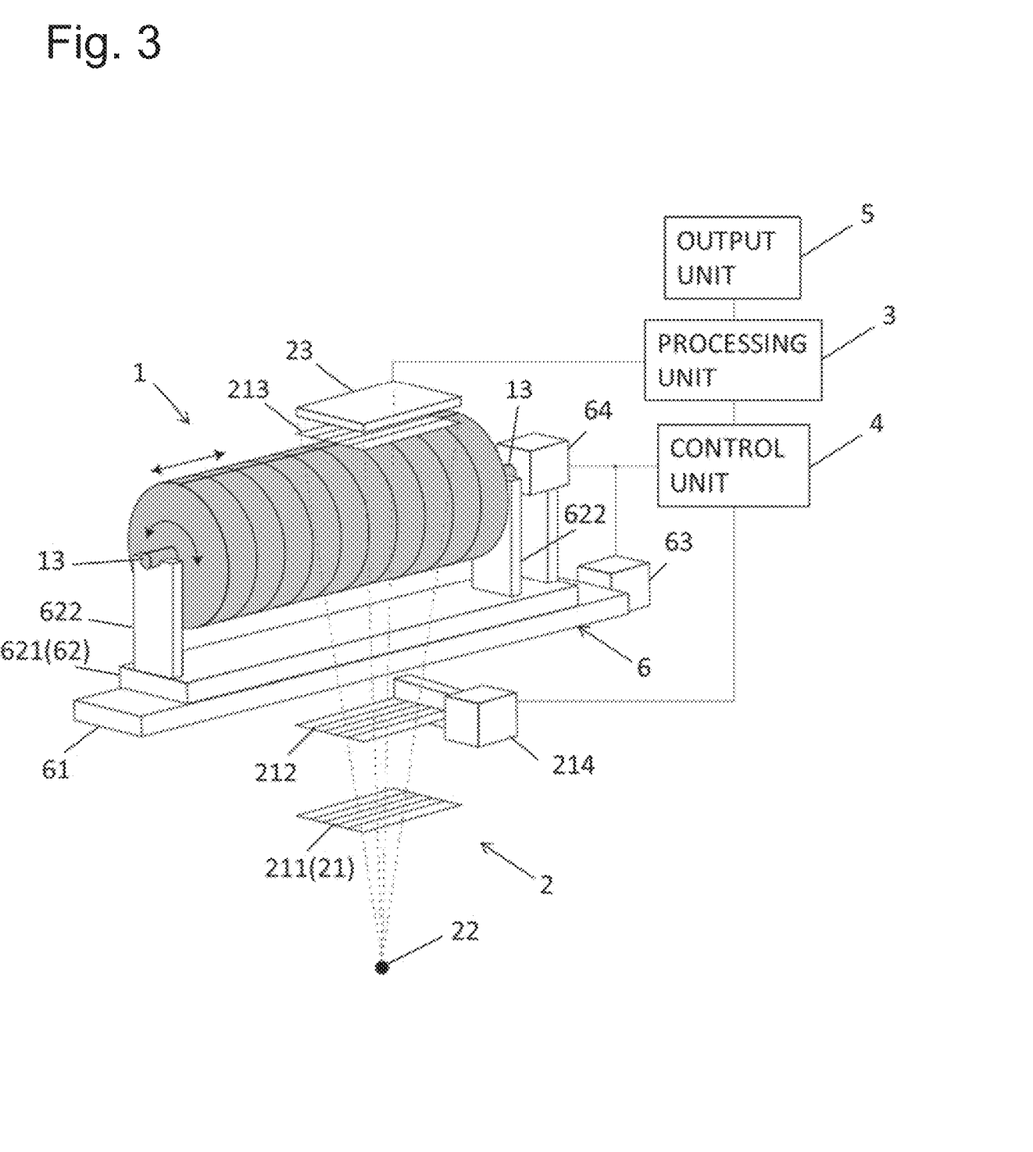
FIG. 3 is a perspective view for explaining a schematic structure of a structure information acquisition apparatus according to an embodiment of the present invention.

This apparatus mainly has a phase-contrast X-ray optical system 2 for acquiring a scattering image of the object 1 and a processing unit 3 (see FIG. 3). Further, the apparatus has a control unit 4, an output unit 5 and a support mechanism 6 (see FIG. 3). Note that the shape of the object 1 shown in FIG. 3 is different from that shown in FIG. 1 in that both ends are flat, and the central shaft 13 protrudes outward from both end surfaces. However, the basic configuration is the same as the example of FIG. 1.

(Phase-Contrast X-Ray Optical System)

The phase-contrast X-ray optical system 2 has a grating unit 21, a radiation source 22 for irradiating the grating unit 21 and the object 1 with X-rays, and a detection unit 23 for detecting X-rays having passed through the grating unit 21 and the object 1.

The grating unit 21 has a G0 grating 211, a G1 grating 212, and a G2 grating 213 for constituting a Talbot-Lau interferometer. Further, this grating unit 21 has a grating drive unit 214 for driving the G1 grating 212 to perform what is called a fringe scanning method. The G0 grating 211 is an absorption grating through which X-rays, from the radiation source 22 generating non-coherent X-rays, penetrate to equivalently generate a plurality of coherent point light sources. In other words, the G0 grating 211 can be said to be substantially a part of the radiation source. In this example, the periodic direction of the gratings of the G0 to G2 gratings 211 to 213 are the direction perpendicular to the axis of the object 1 (see FIG. 5 described later), but can also be the direction parallel to the axis of the object 1. The grating drive unit 214 can use an appropriate drive mechanism capable of driving the grating by predetermined steps at required timing, such as a ball screw, linear motor, piezo element, or electrostatic actuator.

The radiation source 22 is used for generating X-rays of required intensity and irradiating the grating unit 21 and the object 1 with them. The radiation source 22 can use a source that generates non-coherent X-rays in the case of a Talbot-Lau interferometer configuration. In a case in which the G0 grating is omitted, a radiation source is used which generates X-rays phases of which are spatially aligned (that is, coherent) to the extent necessary for practical use (for example, a minute point light source, etc.). In the present embodiment, the direction of X-rays from the radiation source 22 to the object 1 is along the tangential direction of the curved carbon fibers 12. This point will be further described later.

The detection unit 23 has a plurality of pixels (not shown) capable of providing practically sufficient resolution, and can acquire, with these pixels, an intensity distribution image of X-rays that have passed through the grating unit 21 and the object 1. The intensity distribution image acquired by the detection unit 23 is sent to the processing unit 3.

Since the phase-contrast X-ray optical system 2 used in the present embodiment may be basically the same as that conventionally used, further detailed description is omitted (reference: International Publication No. WO 2004/058070, Pfeiffer F, Weitkamp T, Bunk O, David C, Phase retrieval and differential phase-contrast imaging with low-brilliance X-ray sources. Nat. Phys. 2 (2006) 258-261).

(Processing Unit)

Figure 4:
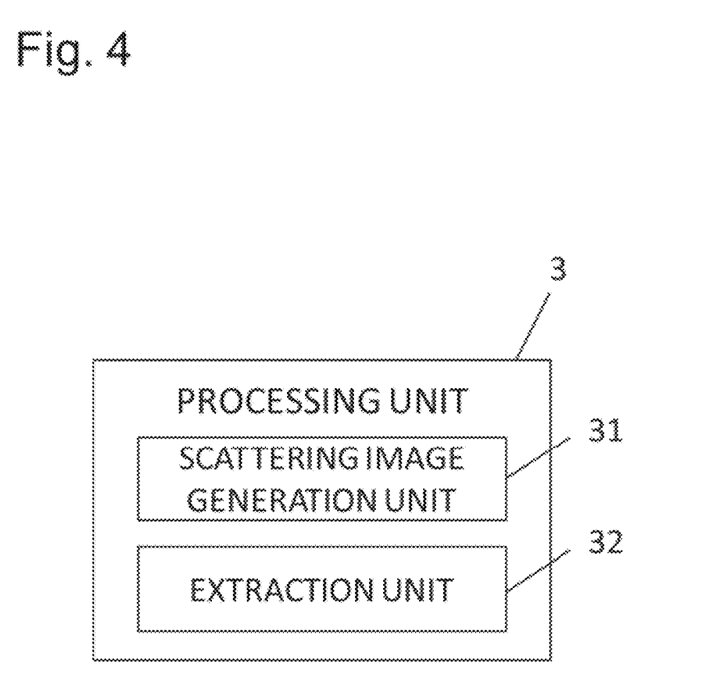
FIG. 4 is a block diagram for explaining a processing unit to be used in the apparatus of FIG. 3.
Figure 5:
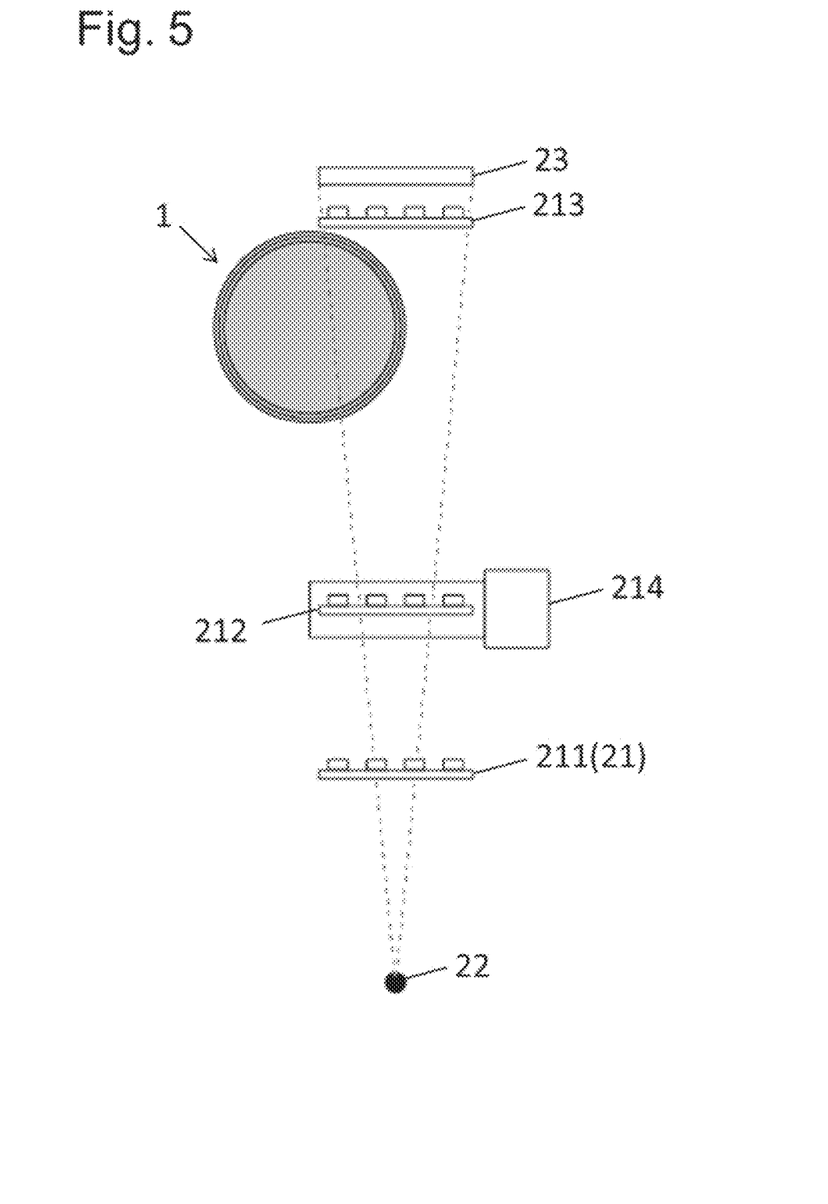
FIG. 5 is a schematic explanatory view of the apparatus of FIG. 3 cut along a plane perpendicular to an axis of the object.

The processing unit 3 has: a scattering image generation unit 31 for obtaining a scattering image based on the intensity distribution image of the X-rays obtained by the detection unit 23 of the phase-contrast X-ray optical system 2; and an extraction unit 32 for extracting structure information of the carbon fibers 12 from the obtained scattering image (see FIG. 4).

Operation of the scattering image generation unit 31 and the extraction unit 32 will be described later. The processing unit 3 is specifically implemented by a combination of computer hardware and software.

(Control Unit)

The control unit 4 controls the drive amount (i.e., movement amount or movement angle) and drive time of each of the grating drive unit 214, an axial drive unit 63 (described later), and a circumferential drive unit 64 (described later) of the support mechanism 6. The control unit 4 is also implemented by a combination of computer hardware and software. The functions of the control unit 4 may be implemented in the processing unit 3 to integrate both.

(Output Unit)

The output unit 5 is used for outputting a result of processing with the processing unit 3 to a user or other equipment. The output unit 5 is, for example, a display or a printer, but may be an interface for connecting other equipment that receives the result of processing. Also, the output unit 5 may be one that transmits the result of processing to other equipment via a network.

(Support Mechanism)

The support mechanism 6 supports the object 1 so that the direction of X-rays radiated from the radiation source 22 of the phase-contrast X-ray optical system 2 is in the tangential direction of the curved carbon fibers 12. Specifically, the support mechanism 6 of the present embodiment has: a base 61 fixed to the floor side; a support 62 mounted on the base 61; an axial drive unit 63 for driving the support 62; and a circumferential drive unit 64 for rotating the object 1.

The support 62 has: a slide unit 621 that is movable in the axial direction of the object 1 (or the length direction of the base 61) with respect to the base 61; and two support arms 622 projecting upward from the slide unit 621. The slide unit 621 can be moved by a predetermined distance in the axial direction of the object 1 by the axial drive unit 63. The support arms 622 supports the central shaft 13 (see FIG. 3) protruding outward from the axial ends of the object 1 to hold the object 1 at an appropriate height. Thus, the support 62 of the present embodiment supports the object 1 so that the axis of the object 1 is oriented in horizontal direction.

Figure 6:
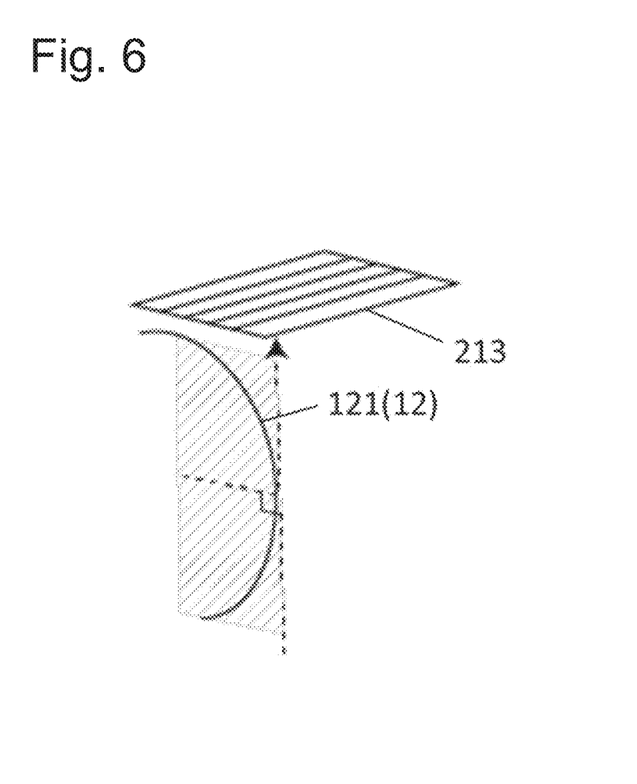
FIG. 6 is a schematic explanatory view for explaining a positional relationship among a fiber, X-rays and a grating.

Further, the support 62 arranges the object 1 between the G1 grating 212 and the G2 grating 213. The support 62 of the present embodiment also supports the object 1 (See FIGS. 5 and 6) so that the direction of X-rays radiated from the radiation source 22 of the phase-contrast X-ray optical system 2 is along the tangential direction of the curved carbon fibers 12. Here, FIG. 6 schematically shows only the positional relationship between a part of the hoop-winding 121 in the carbon fiber 12, the G2 grating 213, and the X-rays. Further, the support 62 supports the object 1 so that the X-ray irradiation range (field of view) is off the axis of the object 1 (see FIG. 5).

The axial drive unit 63 can move the slide unit 621 by a predetermined distance at a predetermined time in response to a command from the control unit 4.

The circumferential drive unit 64 is connected to the central shaft 13 of the object 1, and can rotate the object 1 by a predetermined angle at a predetermined time in response to a command from the control unit 4.

(Structure Information Acquisition Method in the Present Embodiment)

An example of a method of acquiring structure information of the object 1 using the above-described apparatus will be described below with further reference to FIG. 7.

Figure 7:
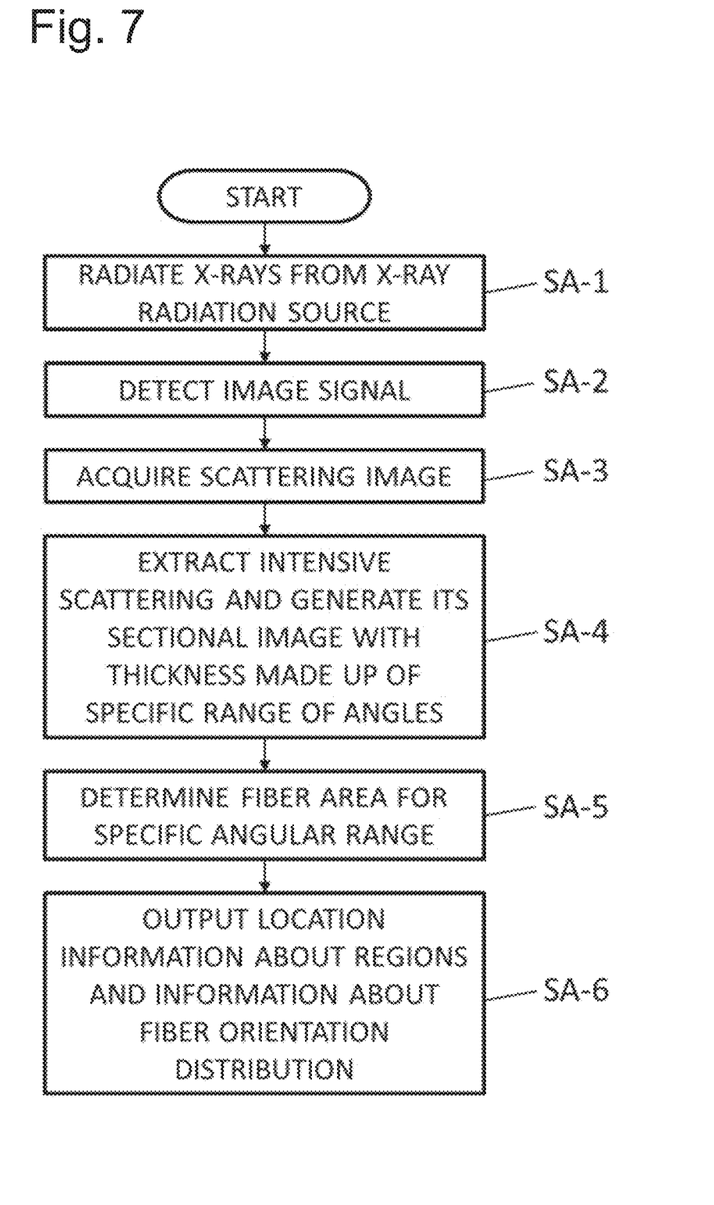
FIG. 7 is an explanatory diagram for explaining a procedure of the structure information acquisition method according to an embodiment of the present invention.

(Step SA-1 in FIG. 7)

First, the object 1 is supported by the support mechanism 6, as shown in FIG. 3. In this state, the object 1 is substantially horizontal. At this time, the object 1 is supported so that the direction of X-rays radiated from the radiation source 22 of the phase-contrast X-ray optical system 2 is along the tangential direction of the curved carbon fibers 12 (see FIGS. 5 and 6). Thereby, the object 1 can be irradiated with X-rays from the radiation source 22 of the phase-contrast X-ray optical system 2 in the tangential direction of the curved carbon fibers 12. Here, a deviation of about ±5° is normally allowed as the X-ray irradiation angle. In other words, the irradiation angle of X-rays may be accurate enough for practical use, and does not need to be mathematically exact. In addition, in the present embodiment, as shown in FIG. 5, the axis of the object 1 is off the field of view and the outer peripheral surface of the object 1 is arranged within the field of view. This facilitates the work of setting the X-ray irradiation direction to the tangential direction of the carbon fibers 12.

(Step SA-2 in FIG. 7)

The X-rays radiated from the radiation source 22 toward the object 1 pass through the grating unit 21 and the object 1 and reach the detection unit 23. More specifically, in the present embodiment, X-rays penetrate through the G0 grating 211, the G1 grating 212, the object 1, and the G2 grating 213 in this order, and reach the detection unit 23. The detection unit 23 acquires an intensity distribution image (that is, a detection signal or an image signal) of the X-rays that have reached the detection unit 23. The acquired intensity distribution image is sent to the processing unit 3. Here, in the present embodiment, a usual fringe scanning method is performed. In other words, the control unit 4 drives the grating drive unit 214 of the grating unit 21 to move the grating (G1 grating in this example) by appropriate steps. An intensity distribution image is acquired at each step.

(Step SA-3 in FIG. 7)

The scattering image generation unit 31 of the processing unit 3 acquires a scattering image using the obtained intensity distribution image. The scattering image acquisition method itself may be the same as a conventionally known method, so detailed description thereof will be omitted.

(Steps SA-4 and SA-5 in FIG. 7)

Next, the extraction unit 32 of the processing unit 3 acquires structure information of the anisotropic materials based on the scattering image. More specifically, the extraction unit 32 extracts regions where intensive scattering occur, and identifies the regions as a sectional image of fibers in a specific angular range. The principle of this extraction will now be described with further reference to FIG. 8.

Figure 8:
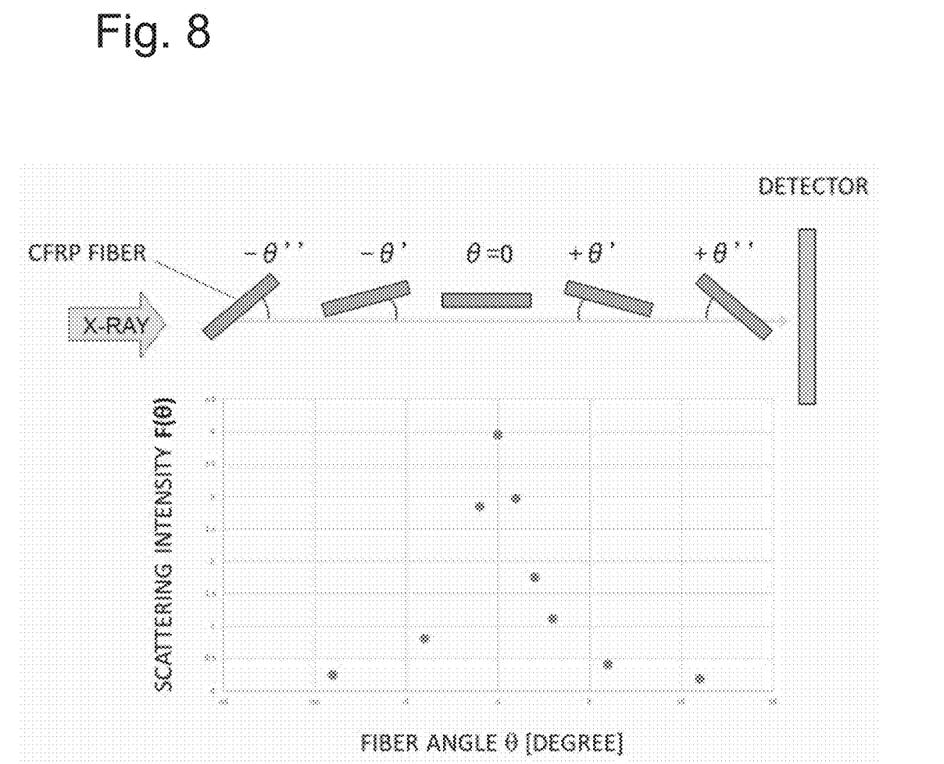
FIG. 8 is a graph showing a relationship between fiber angles (degrees) and scattering intensities (arbitrary unit), and an explanatory diagram explaining how to take the fiber angles.

FIG. 8 shows the relationship between the fiber angle $\theta°$ and the scattering intensity $F(\theta)$. As can be seen from this figure, the scattering intensity reaches a maximum at the fiber angle $\theta=0°$, and decreases as $\theta$ increases (or decreases).

Figure 9:
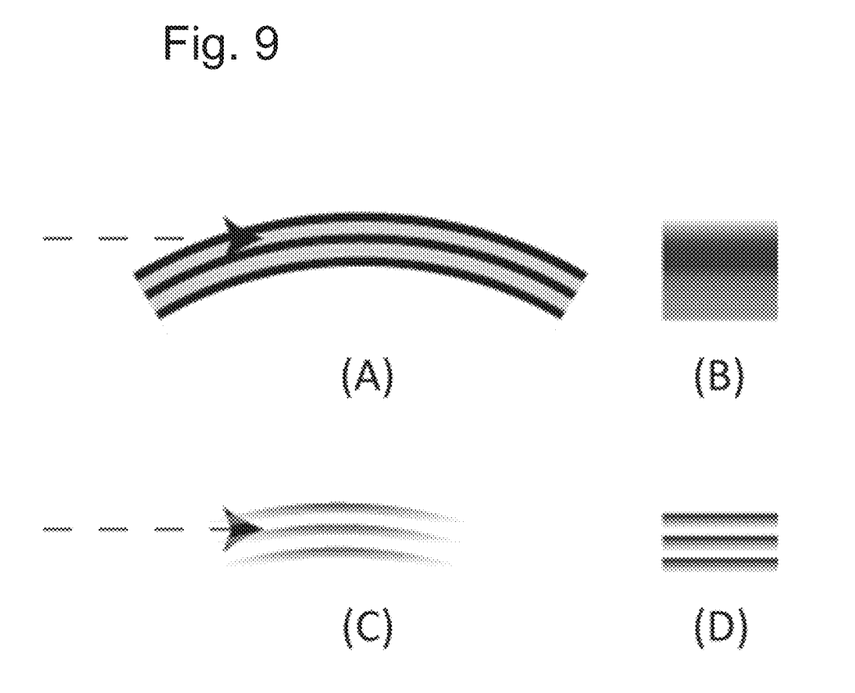
FIG. 9(A) is a cross-sectional view of fibers in layer structures.
FIG. 9(B) is an intensity distribution image obtained by X-ray irradiation in tangential directions of the fibers.
FIG. 9(C) is a scattering image as viewed from the same direction as in FIG. 9(A)
FIG. 9(D) is a scattering image obtained by X-ray irradiation in the same direction as in FIG. 9(B)

This point will be schematically described with further reference to FIG. 9. If the curved fibers have layer structures as shown in FIG. 9(A), the intensity distribution image resolved by X-rays radiated in a direction of an arrow in the figure (that is, the tangential direction of the fiber) has a gradation with unclearly defined regions and low contrast, as shown in FIG. 9(B). This makes it difficult to measure the layer structures.

On the other hand, as shown in FIG. 9(D), the scattering image has a fringe pattern with clear contrast according to the fiber angle $\theta$. Thus, in the present embodiment, the scattering image can be used to determine fiber regions in a specific angular range. Note that the density in FIG. 9(C) is lighter than that in FIG. 9(A), but this is because a scattering image is used, and the physical structure of the object is the same as in FIG. 9(A). In addition, FIG. 9 is for schematic description only. When an object including curved fibers is irradiated with X-rays, the direction of the fibers locally matches the direction of the X-rays (within approximately $\pm 5°$), generating intensive scattering. The extraction unit 32 can extract only this intensive scattering using, for example, an appropriate threshold value, to generate a sectional image having a slice thickness made up of a certain angular range component. From the sectional image, it is possible to determine the fiber regions that are substantially aligned with the X-ray irradiation direction.

(Step SA-6 in FIG. 7)

The extraction unit 32 can generate and output positional information (ends, area, length) of fiber regions that are substantially aligned with the X-ray irradiation direction and information on an angular distribution within the regions. In other words, the processing unit 3 can calculate various kinds of information, such as positional information and distribution information, about fiber regions within a specific angular range, and send the calculated information to the output unit 5. The output unit 5 can output these pieces of information to the user or other equipment. A specific example of the information to be extracted will be described as Example 1 below.

After acquisition of information on a predetermined part, the control unit 4 drives the circumferential drive unit 64 to rotate the object 1, and this makes it possible to acquire structure information of another part of the object 1 (a part shifted in the circumferential direction). Further, the control unit 4 drives the axial drive unit 63 to move the object 1 in the axial direction, and this makes it possible to acquire structure information of yet another part of the object 1 (a part shifted in the axial direction). Either of the circumferential drive unit 64 and the axial drive unit 63 may be driven first, or they may be driven at the same time. In addition, before or during processing in the processing unit 3 (that is, generation of the scattering image or extraction of information), the object 1 may be appropriately driven to sequentially acquire intensity distribution images at required positions.

According to the method of the present embodiment, the position of an anisotropic material such as carbon fiber can be acquired non-destructively and accurately based on the contrast of the scattering image, without using CT. In the present embodiment, since there is no need to use CT, it is possible to target a large object such as a hydrogen tank.

Example 1

Figure 10:
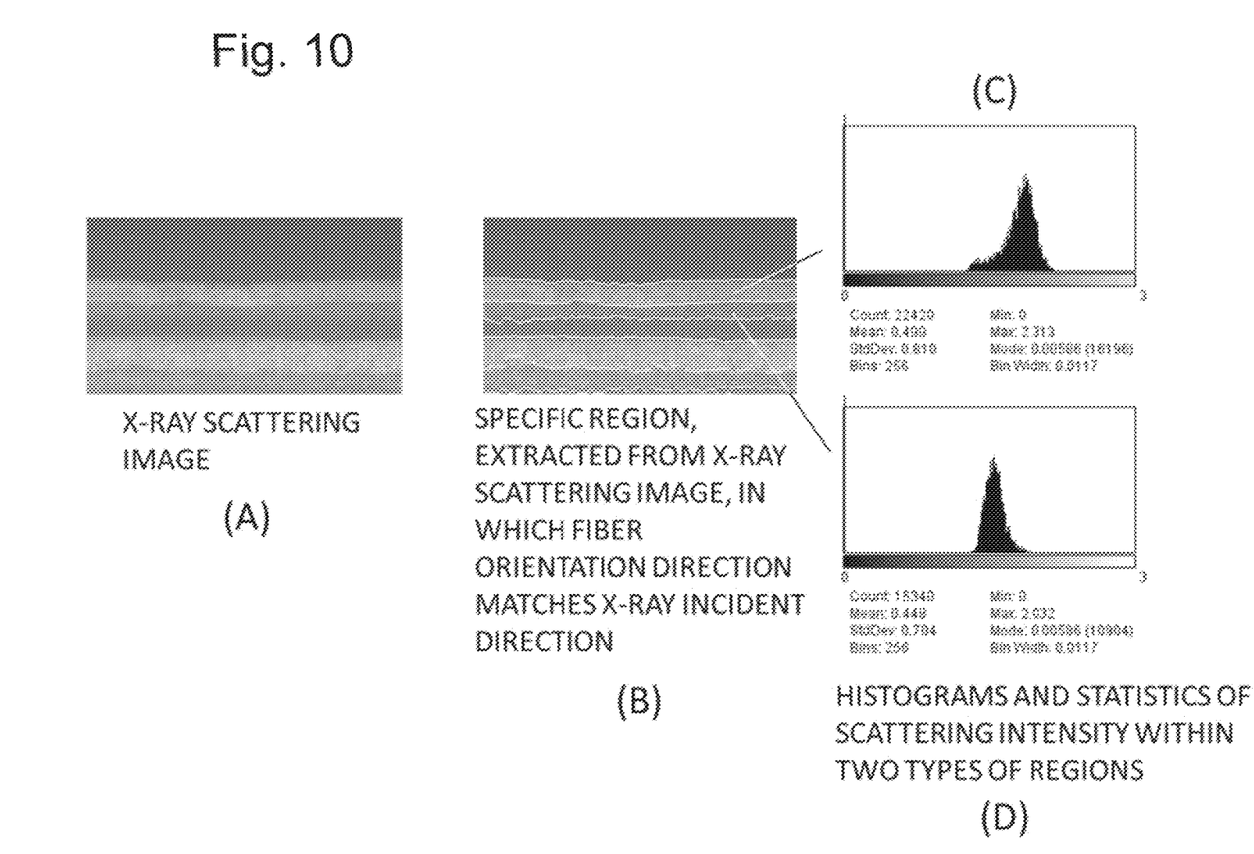

There is shown an example of the scattering image acquired with the method of the present embodiment in FIG. 10(A). Using a scattering image makes an image with a well-defined regions and clear contrast, and this makes it possible to identify the layer structures. FIG. 10(B) shows an example in which the fiber orientation structures corresponding to the hoop-layer and the highly helical layer are identified based on the image. White lines here indicate the borders of the regions. Examples of information corresponding to individual specific regions are shown in FIGS. 10(C) and 10(D). These figures show histograms and statistics of scattering intensity within the regions. Here, for example, the histogram in FIG. 10(C) is asymmetric with respect to the peak, and has many pixels with low luminance values. This suggests that there are many fibers oriented away from the X-ray incident direction. Conversely, the histogram in FIG. 10(D) indicates that there are many pixels with high luminance values and many fibers are oriented close to the X-ray incident direction. Further, it is also possible to quantitatively evaluate the orientation unevenness of the fibers from statistical quantities such as the dispersion and the kurtosis of the scattering intensity within the region.

Figure 11:
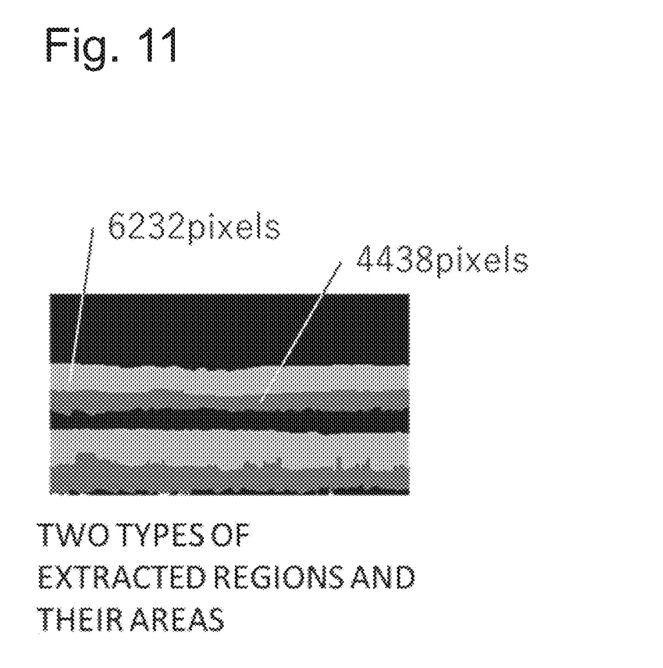
FIG. 11 is an explanatory view showing an example of information extracted from a scattering image in Example 1.

In addition, FIG. 11 illustrates two types of extracted regions and their areas (the number of pixels). This is also an example of information corresponding to the region.

Thus, in the present embodiment, quantitative information regarding the position and orientation of fibers can be acquired.

Example 2

Here, the positional relationship between the grating unit 21 and the object 1 will be described in detail as Example 2. In the embodiment described above, it is preferable to set the position of the object 1 (particularly, the region where the orientation of the fiber to be imaged matches the X-ray incident direction) within the range from the midpoint of the G1 grating 212 and the G2 grating 213 to the G2 grating 213, with what is called an inverse geometry (meaning the grating period (G0 period) of the G0 grating 211 the grating period (G2 period) of the G2 grating 213, with reference to T. Donath, et al, "Inverse geometry for grating-based x-ray phase-contrast imaging", J. Appl. Phys., 106 (2009) 054703). The reason is as follows.

The optical system of the present embodiment is designed with the expectation of two effects. One is to decrease the effect of defocusing, and the other is to decrease the sensitivity to scattering. To maximize the former effect, it is desirable to place the object 1 at a position as close to the detection unit 23 as possible. The latter effect depends on the structure of the object 1, so it does not necessarily have to be maximized, but at least it is important to keep the object 1 away from the G1 grating 212 and closer to the G2 grating 213. This is because the scattering from the fiber that corresponds with the X-ray incident direction is extremely intensive, so that the measurement with the fiber being placed at a position close to the G1 grating 212 lowers the coherence of X-rays too much, requiring an extremely long period of measurement.

Here, in a general Talbot-Lau interferometer (G0 period>G2 period), the distance between the detection unit 23 and the G1 grating 212 is small, and it is difficult to bring the object 1 closer to the G2 grating 213. Instead, it is preferable in the present embodiment to employ an inverse geometry so as to be G0 period<G2 period. This makes it easier to employ a configuration in which the object 1 is inserted between: the midpoint of the G1 grating 212 and the G2 grating 213; and the G2 grating 213, and the above two effects are likely to be exhibited.

Note that the description of the embodiment and examples is merely an example, and does not show the configuration essential to the present invention. The configuration of each unit is not limited to the above as long as the gist of the present invention can be achieved.

For example, the anisotropic material may be curved to form an ellipse.

Also, the number of layers in the carbon fibers 12 is not limited to two or three, and may be one, or four or more.

Further, although the above embodiment is described based on the fringe scanning method, a Fourier transform method can also be used to acquire an X-ray phase image. It is also possible to perform a substantial fringe scanning method by moving the object 1 instead of moving any of the gratings stepwise.

Further, the object 1 is not limited to a hydrogen tank. It is possible to use another structure with curved anisotropic materials, as an object. Here, the object 1 is not limited to a large-sized sample such as a tank, and may be a small-sized sample.

Further, the work of extracting structure information from the scattering image can be performed by an operator instead of the processing unit 3.

Also, the G0 grating can be omitted by using a structured target substantially equivalent to the G0 grating as the radiation source 22.

Further, as the grating unit 21, a grating unit called edge illumination can be used to generate a scattering image without using the configuration of the Talbot-Lau interferometer (reference: A. Olivo, "Edge-illumination x-ray phase-contrast imaging", J. Phys.: Condens. Matter 33 (2021) 363002).

In addition, if it is desired to increase the sensitivity to scattering for a structural reason of the object 1, it is desirable to employ a general Talbot-Lau interferometer instead of an inverse geometry, and insert the object 1 between the midpoint of the G1 grating 212 and G2 grating 213 and the G1 grating 212.

Furthermore, it is also possible to acquire a plurality of scattering images by varying the periodic direction in the grating unit and to compare them to extract the scattering component based on the anisotropy in a specific direction.

REFERENCE SIGNS LIST 1 object
11 liner portion
12 carbon fiber (anisotropic material)
121 hoop-winding (hoop-layer)
122 high-angle helical winding (high-angle helical layer)
123 low-angle helical winding (low-angle helical layer)
13 central shaft
2 X-ray optical system
3 processing unit
31 scattering image generation unit
32 extraction unit
21 grating unit
211 G0 grating
212 G1 grating
213 G2 grating
214 grating drive unit
22 radiation source
23 detection unit
4 control unit
5 output unit
6 support mechanism
61 base
62 support
621 slide unit
622 support arm
63 axial drive unit
64 circumferential drive unit

What is claimed is:

1. A structure information acquisition method for acquiring structure information of an object having a anisotropic material which is extended in a predetermined direction and curved using a phase-contrast X-ray optical system, the structure information acquisition method comprising:
    a step of irradiating the object with X-rays along a tangent line of the curved anisotropic material and in the extended direction of the anisotropic material from a radiation source of the phase-contrast X-ray optical system;
    a step of obtaining a scattering image using a detection signal of the X-rays having penetrated through the object; and
    a step of acquiring structure information of the anisotropic material based on contrast in the scattering image according to a degree of misalignment between the extended direction of the anisotropic material and the direction of X-rays.

2. The structure information acquisition method according to claim 1, wherein
    the object is a high-pressure tank, the anisotropic material is a fiber constituting the high-pressure tank, a part of the fiber is wound in a hoop-winding, and another part of the fiber is wound in a direction different from a direction of the hoop-winding.

3. The structure information acquisition method according to claim 1, wherein
the anisotropic material is curved to form a circle or an ellipse.

4. The structure information acquisition method according to claim 1, further comprising a step of supporting the object before irradiating the object with the X-rays, wherein
in the step of supporting the object, the object is supported so that a direction of X-rays radiated from a radiation source of the phase-contrast X-ray optical system is along the tangent line of the curved anisotropic material.

5. A structure information acquisition apparatus, comprising:
a phase-contrast X-ray optical system for acquiring a scattering image of an object; and
a processor implemented computer hardware and computer software, wherein
the phase-contrast X-ray optical system includes a grating, a radiation source for irradiating the grating and the object with X-rays, and a detector for detecting the X-rays having passed through the grating and the object,
the object includes a anisotropic material which is extended in a predetermined direction and curved,
a direction of the X-rays from the radiation source is along a tangent line of the curved anisotropic material and in the extended direction of the anisotropic material, and
the processor is configured to
obtain a scattering image based on an intensity distribution image of the X-rays obtained by the detector, and
extract structure information of the anisotropic material based on contrast in the scattering image according to a degree of misalignment between the extended direction of the anisotropic material and the direction of X-rays.

6. The structure information acquisition apparatus according to claim 5, further comprising a support mechanism for supporting the object, wherein
the support mechanism is configured to support the object so that a direction of X-rays radiated from the radiation source of the phase-contrast X-ray optical system is along the tangent line of the curved anisotropic material.

* * * * *